United States Patent [19]
Pouet et al.

[11] Patent Number: 5,481,356
[45] Date of Patent: Jan. 2, 1996

[54] APPARATUS AND METHOD FOR NONDESTRUCTIVE TESTING USING ADDITIVE-SUBTRACTIVE PHASE-MODULATED INTERFEROMETRY

[75] Inventors: Bruno F. Pouet, Evanston; Tom C. Chatters, Chicago; Sridhar Krishnaswamy, Evanston, all of Ill.

[73] Assignee: Northwestern University, Evanston, Ill.

[21] Appl. No.: 231,936

[22] Filed: Apr. 25, 1994

[51] Int. Cl.$^6$ .................................................. G01B 9/02
[52] U.S. Cl. .......................... 356/35.5; 356/345; 356/347
[58] Field of Search .................................. 356/346, 353, 356/355, 35.5, 357, 432 T, 345

[56] References Cited

U.S. PATENT DOCUMENTS

| | | | |
|---|---|---|---|
| 3,828,126 | 8/1974 | Ramsey, Jr. | 356/109 |
| 5,094,528 | 3/1992 | Tyson, II et al. | 356/35.5 |

OTHER PUBLICATIONS

Publication "ESPI with Synchronized Pressure Stressing", by Chatters et al, SPIE, vol. 1821, (1992), pp. 38–45.

Primary Examiner—Samuel A. Turner
Assistant Examiner—Robert Kim
Attorney, Agent, or Firm—William H. Eilberg

[57] ABSTRACT

A video camera records a series of interferometric images of a test object, while the object is subjected to a repeated and varying level of stress. At least one pair of interferometric images, taken during the same video frame, and corresponding to different levels of stress, are added together, in an analog manner, to form a composite image which is then stored in digital form. During the next video frame, the phase of the light used to generate the interferometric image is altered, and the process is repeated. The digitally-stored composite images obtained during two successive video frames are subtracted from each other to produce a second-order composite image which reveals information about the condition of the object. The second-order composite image includes fringes of high contrast, and is not adversely affected by most ambient noise.

20 Claims, 11 Drawing Sheets

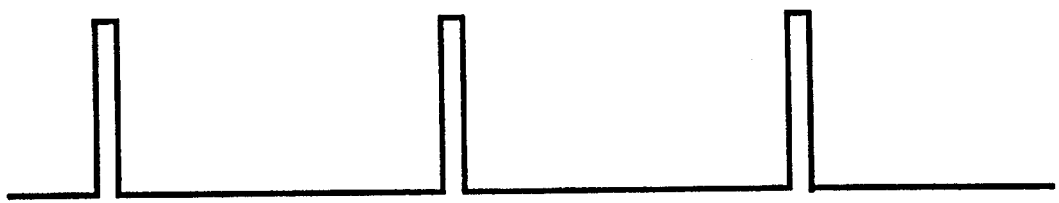
F I G. 5a
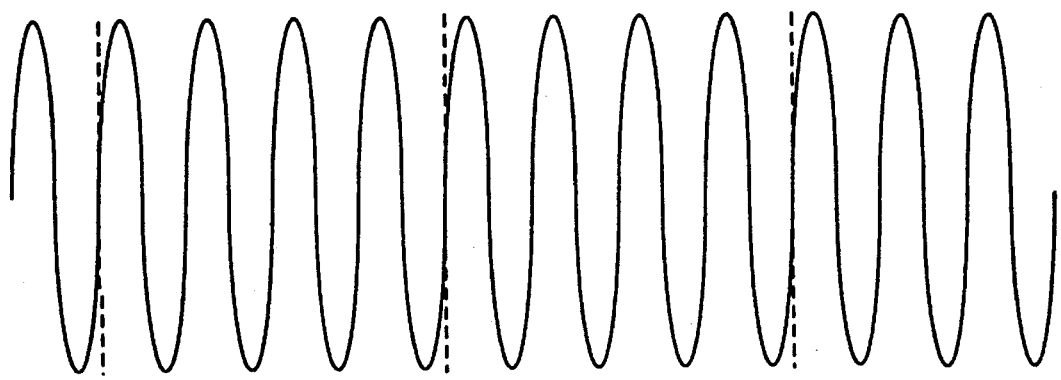
F I G. 5b
F I G. 5c
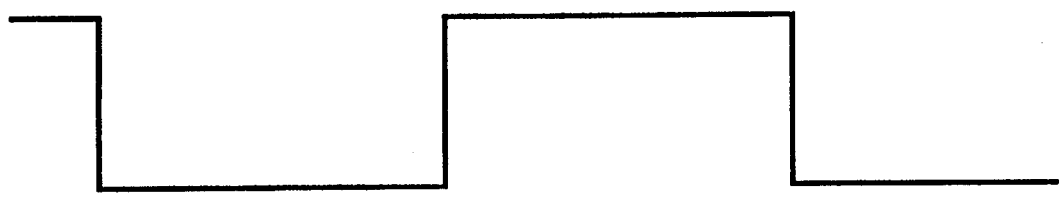
F I G. 5d

ASPM-ESPI

ASPM-ESPI

ASPM-ESPI

ASPM-ESPI

ASPM-ESPI

APPARATUS AND METHOD FOR NONDESTRUCTIVE TESTING USING ADDITIVE-SUBTRACTIVE PHASE-MODULATED INTERFEROMETRY

BACKGROUND OF THE INVENTION

This invention relates to the field of nondestructive testing by optical speckle interferometry. The invention provides a method and apparatus which reduces or eliminates the effect of noise on the test results, while still providing a sharp image which can be viewed in "real time" on a video display.

Optical interferometric techniques have been known for nondestructive testing (NDT) of objects. Two of these techniques include electronic speckle pattern interferometry (ESPI) and speckle shearing interferometry, also known as shearography. In ESPI, a laser beam is directed towards the test object, and the light reflected from the object is made to interfere optically with a reference beam which does not touch the object. For a diffuse, opaque object, the interference pattern typically contains speckles, and the result is therefore called a speckle pattern. Analysis of the speckles provides information about the structural integrity of the object.

In shearography, two images of the same object are taken, but the images are laterally displaced, by a small amount, relative to each other, and made to interfere. The interference pattern gives information about the state of the object. Because the two images are laterally displaced, or "sheared", the interference pattern is known as a "shearogram" and the technique is called shearography.

Both ESPI and shearography are powerful tools that can be used to detect hidden defects in aircraft parts, turbine blades, space vehicles, automobiles, and many other products. However, such techniques are extremely susceptible to noise that permeates most industrial environments. The latter problem arises because speckle interferometric techniques are comparative methods which analyze the object during two different states of stress. A finite period of time is needed to record information about the condition of the object at a given level of stress, and to induce a change in the state of the object. Any noise that occurs during this interval degrades the resulting signal. The longer the interval, the poorer the quality of the signal.

The most commonly used interferometric technique involves subtraction. Two images, each representing information about the state of the object at a particular level of stress, are subtracted from each other digitally, pixel by pixel, to produce a second-order image. In a noise-free environment, this second-order image appears on a video screen as a set of bright interference fringes having excellent contrast. However, the digitization process restricts the time interval between states to be no shorter than an interval implied by the video framing rate, which is typically 30 Hz. Therefore, any noise of higher frequency than the video framing rate will distort the signal and will significantly reduce the signal to noise ratio of the system.

An additive technique has been proposed to reduce or eliminate the problem of noise. In an additive process, the images corresponding to the object in two different states of deformation are added together, in an analog manner, i.e. by double exposure. Since there is no need to digitize the images before addition, the process can be performed at a substantially faster rate than in the subtractive technique. The additive method therefore provides excellent suppression of noise having frequencies of the order of kHz. Unfortunately, interference fringes obtained from an additive process have very poor contrast and are essentially invisible without some kind of post-process filtering. Such post-exposure processing is a difficult task, and typically yields low-quality information. For this reason, the additive technique has not been used commercially.

The present invention provides a method and apparatus which enjoys the benefits of both the subtractive and additive processes described above, and which can be practically implemented in an industrial environment. The present invention provides superior environmental noise reduction, improved signal contrast and brightness, and can be used as a full-field optical technique in the field of nondestructive testing.

SUMMARY OF THE INVENTION

In the method of the present invention, a video camera records a sequence of interferometric images of a test object. For each video frame, the system records at least two such interferometric images. The object is subjected to repeated and varying levels of stress, such that the level of stress varies within each frame. The two interferometric images, taken within each frame, are taken at times corresponding to different levels of stress. These two images are added together, in an analog manner, by double exposure of the image sensor in the video camera, to produce a composite image. The composite image is digitized and stored.

The same procedure is repeated during the next video frame. However, during the next frame, the system shifts the phase of one or both of the light beams used to generate the interferometric images. There is always a phase shift from one frame to the next. One then digitally subtracts the composite image obtained during a given frame from the composite image obtained during the previous frame, to derive a second-order image. Repetitive operation of the process, in subsequent video frames, yields a series of such second-order images, which can be viewed on a video monitor in "real time".

The interferometric images may be obtained by speckle interferometry, by shearography, or by other interferometric methods. The invention is not limited by the type of interferometry used.

The object can be stressed by acoustic means, such as by operating a loudspeaker in the vicinity of the object, or it can be subjected to pressure that varies over time. The invention is also not limited by the manner of applying stress; the major requirement is that the stress vary over time.

The apparatus used to practice the invention includes a synchronization system which controls the stressing of the object, the taking of interferometric images, and the shifting of the phase of the light.

The invention therefore has the primary object of providing a method of nondestructive testing which produces a fringe pattern having high quality and which also is only minimally affected by noise.

The invention has the further object of providing an apparatus for practicing the above-described method.

The invention has the further object of enhancing the quality and reliability of nondestructive testing of opaque objects.

The invention has the further object of making it feasible to perform nondestructive testing in an industrial environment.

The invention has the further object of providing an apparatus and method as described above, wherein the system can employ various means of generating an interferometric image.

BRIEF DESCRIPTION OF THE DRAWINGS

FIG. 5 provides a pulse diagram explaining the relationship between the video framing, the stressing of the object, and the phase modulation induced in alternate frames, in the method of the present invention.

DETAILED DESCRIPTION OF THE INVENTION

Figure 1:
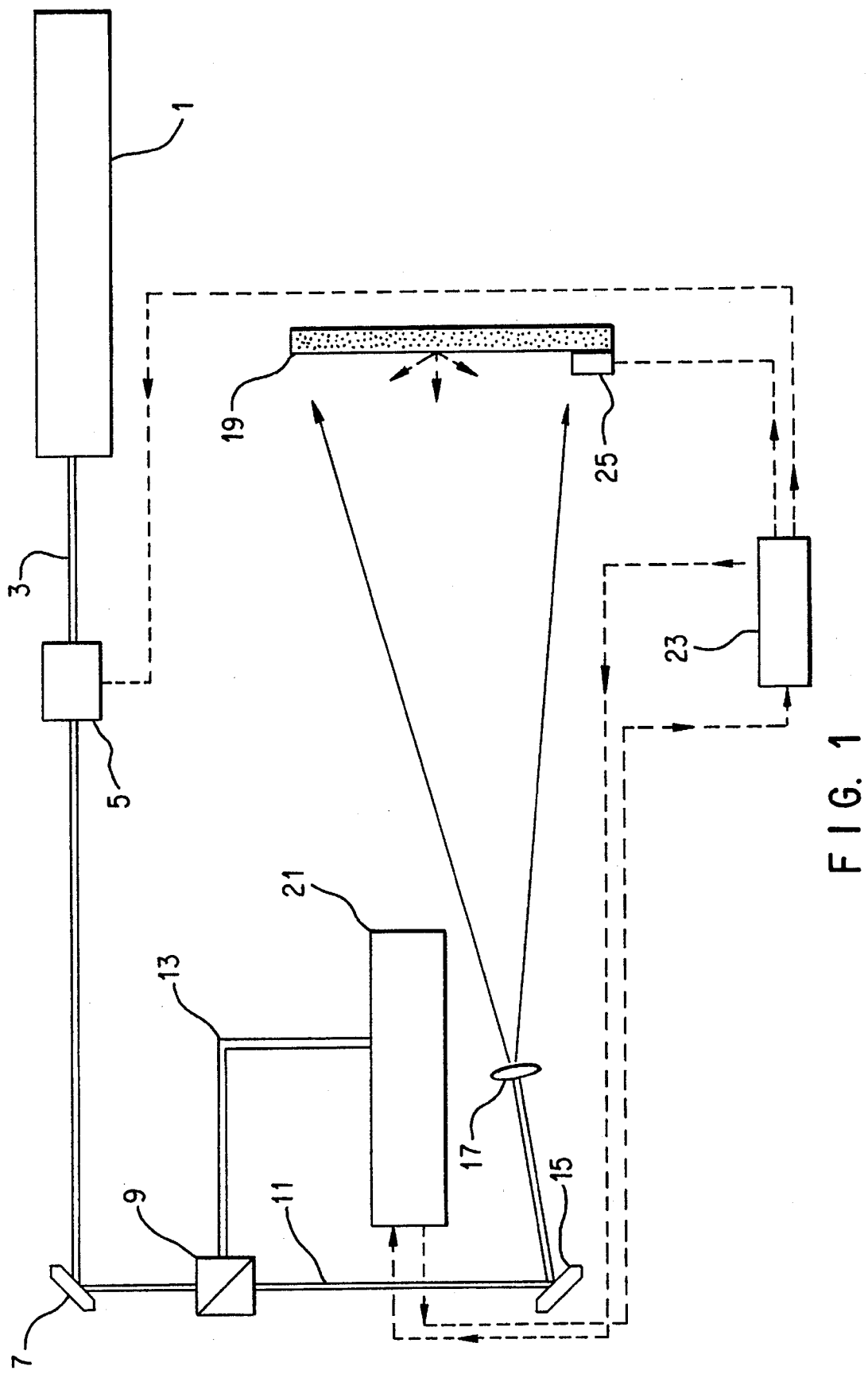
FIG. 1 provides a schematic diagram of an apparatus made according to the present invention, wherein the method of interferometry is ESPI.

FIG. 1 shows a schematic diagram of one embodiment of the apparatus of the present invention. FIG. 5 should be considered together with FIG. 1, for a complete understanding of the principle of operation of the invention.

In FIG. 1, laser 1 produces beam 3 which passes through acousto-optic modulator 5. The acousto-optic modulator serves as an optical "shutter", which rapidly opens and closes a path for light, according to the value of an acoustical input to the device. In practice, the acousto-optic modulator can be a crystal whose index of refraction changes rapidly in response to an ultrasonic wave directed at the crystal. Such a device is commercially available, and does not, by itself, form part of the present invention. Other types of optical shutters could be used instead.

The beam leaving the acousto-optic modulator is reflected by mirror 7 and then reaches beam splitter 9. The beam splitter produces an object beam 11 and a reference beam 13. The object beam is reflected by mirror 15, and is expanded by lens 17, so that it illuminates a large portion of diffuse specimen 19. The reference beam and the reflected light from the object are made to interfere in optical head 21, which includes a video camera (such as a charge-coupled device (CCD)) or equivalent. A synchronization system 23 controls an acoustic stressing device 25, the acousto-optic modulator 5, and a phase modulation means (not shown in FIG. 1) located in the optical head. The synchronization system can be a computer which has appropriate connections to the various components of the apparatus.

FIG. 5 provides a pulse diagram which further explains the operation of the invention. The video camera, contained in the optical head, operates at a particular video refresh rate, typically 30 Hz. Pulses 2 in FIG. 5 symbolize the continued refreshing of the video display, and the space between each pair of pulses defines a video frame. Stressing signal 4 symbolizes the acoustic stress applied to the object. In the example of FIG. 5, this stress is a sinusoidally varying acoustic wave, having a frequency substantially greater than that of the video pulses 2. Thus, the object is deformed by the acoustic wave at least several times during every video frame. Other stressing schemes could be used instead.

Pulses 6 represent the optical shutter. The optical shutter is "open" only when the pulses 6 are "high". In other words, light from the laser is allowed to enter the system, and thereby produce an interference pattern, only during those relatively short intervals when the pulses 6 are "high".

Pulses 8 represent the phase modulation of one or both light beams. In the example of FIG. 5, the phase of one of the beams is switched back and forth, between successive video frames, such that the phase is always different between a given frame and the next frame.

The present invention therefore operates as follows. At least two interference patterns are taken during a particular video frame, and at least two of these patterns are taken at different levels of stress on the object. These patterns are added together, in an analog manner, to form a composite interference pattern, which is then stored digitally. The addition is performed simply by exposing multiple patterns on the image sensor of the video camera, during the same video frame. Interference patterns are similarly obtained in subsequent video frames, with the phase of one of the light beams being shifted when one moves from one frame to the next. Then, the digital representation of the composite pattern for one frame is subtracted from the digital representation of the pattern obtained for the previous frame, the subtraction being performed pixel by pixel. The final result is a second-order composite pattern that can be viewed on a video screen.

In the example shown in FIG. 5, eight images of the object (i.e. eight interference patterns) are obtained during each frame, the images being taken when the object is at maximum and minimum levels of stress. The images could be taken at positions other than at maximum and minimum stress levels, but if more than one pair of images are obtained for each frame, each pair should be taken at the same position relative to the stressing signal. Thus, the four pairs of images taken for each frame add constructively, and yield a more intense signal than would be obtained if only one pair of images were taken during each frame. In general, the pairs of images should be taken sufficiently closely in time that they can double-expose the image sensor of the video camera. It is the closeness in time, of the taking of the images of each pair, which results in the excellent noise suppression achieved by the present invention.

Figure 2A:
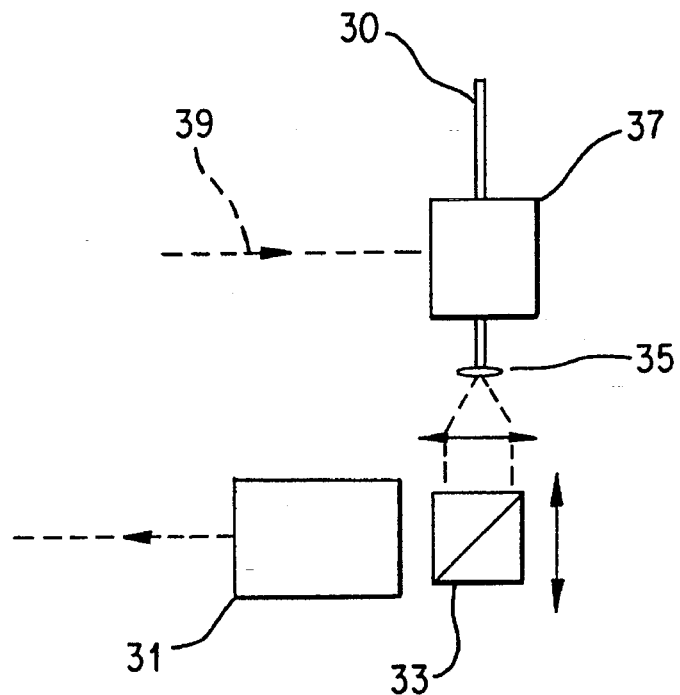
FIGS. 2a and 2b provide schematic diagrams of optical heads which can be used in the apparatus of FIG. 1.
Figure 2B:
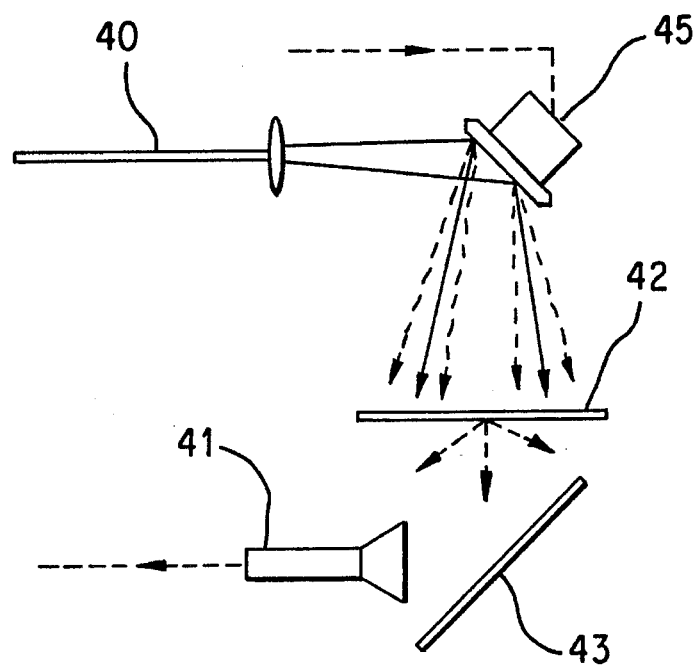

FIGS. 2A and 2B show alternative arrangements for the optical head of FIG. 1. In FIG. 2A, the reference beam 30 is a plane wave, and travels into CCD camera 31 through focusing lens 35 and beam splitter 33. In FIG. 2B, the reference beam 40 is made diffuse by passing it through ground glass 42. The beam then reaches CCD camera 41 via beam splitter 43.

In FIG. 2A, electro-optic modulator 37 varies the phase of the reference beam. Control line 39 provides an electrical signal to the electro-optic modulator, which changes its index of refraction according to the voltage applied at line 39. The electro-optic modulator is commercially available. It is used to provide the phase shift between video frames which is triggered by pulses 8 of FIG. 5. In FIG. 2B, a tilting mirror 45 adjusts the position of the reference beam, and similarly induces a phase shift. In the latter arrangement, the mirror moves back and forth, changing its orientation at the beginning of each frame.

Note that the electro-optic modulator can be used in the case where the reference beam is diffuse, and the tilting mirror can be used in the case where the reference beam is a plane wave. The manner of inducing a phase shift is independent of the character of the reference beam. Also, the invention is not limited to the two disclosed means of inducing a phase shift; other phase-shifting means can be used within the scope of the invention.

Figure 3:
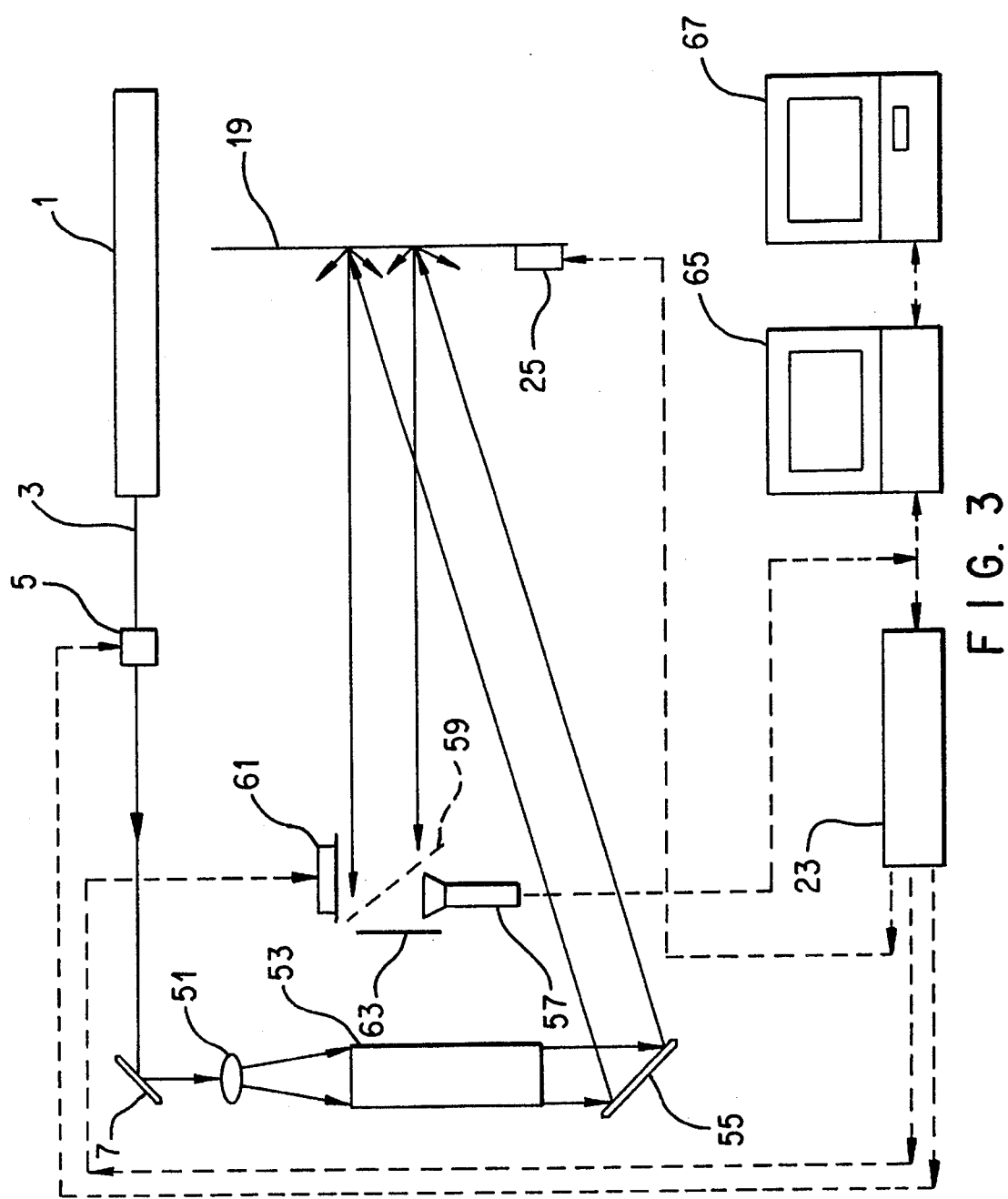
FIG. 3 provides a schematic diagram of an apparatus made according to the present invention, wherein the method of interferometry is shearography.

The arrangement of FIG. 1 uses speckle interferometry, which includes an object beam and a reference beam. In FIG. 3, the method of interferometry is shearography. Reference numerals similar to those of FIG. 1 identify similar components. In FIG. 3, the light reflected from mirror 7 passes through lens 51 and collimator 53, and is reflected from mirror 55. A pair of laterally-displaced images are formed in CCD camera 57, after the light has passed through beam splitter 59 and has been reflected by mirrors 61 or 63. The position of mirror 61 is adjusted by synchronization system 23. FIG. 3 also explicitly shows an image processor 65 and a computer 67. In FIG. 3, a phase shift is induced in one of the two beams forming the shearogram by adjusting the position of mirror 61, as commanded by the synchronization system. The mirror 61 is therefore translated and not rotated. The phase shift is therefore introduced after image shearing occurs. The pulse diagram of FIG. 5 also applies to the arrangement of FIG. 3; indeed, the basic principle of the present invention is independent of the method of interferometry used.

Figure 4:
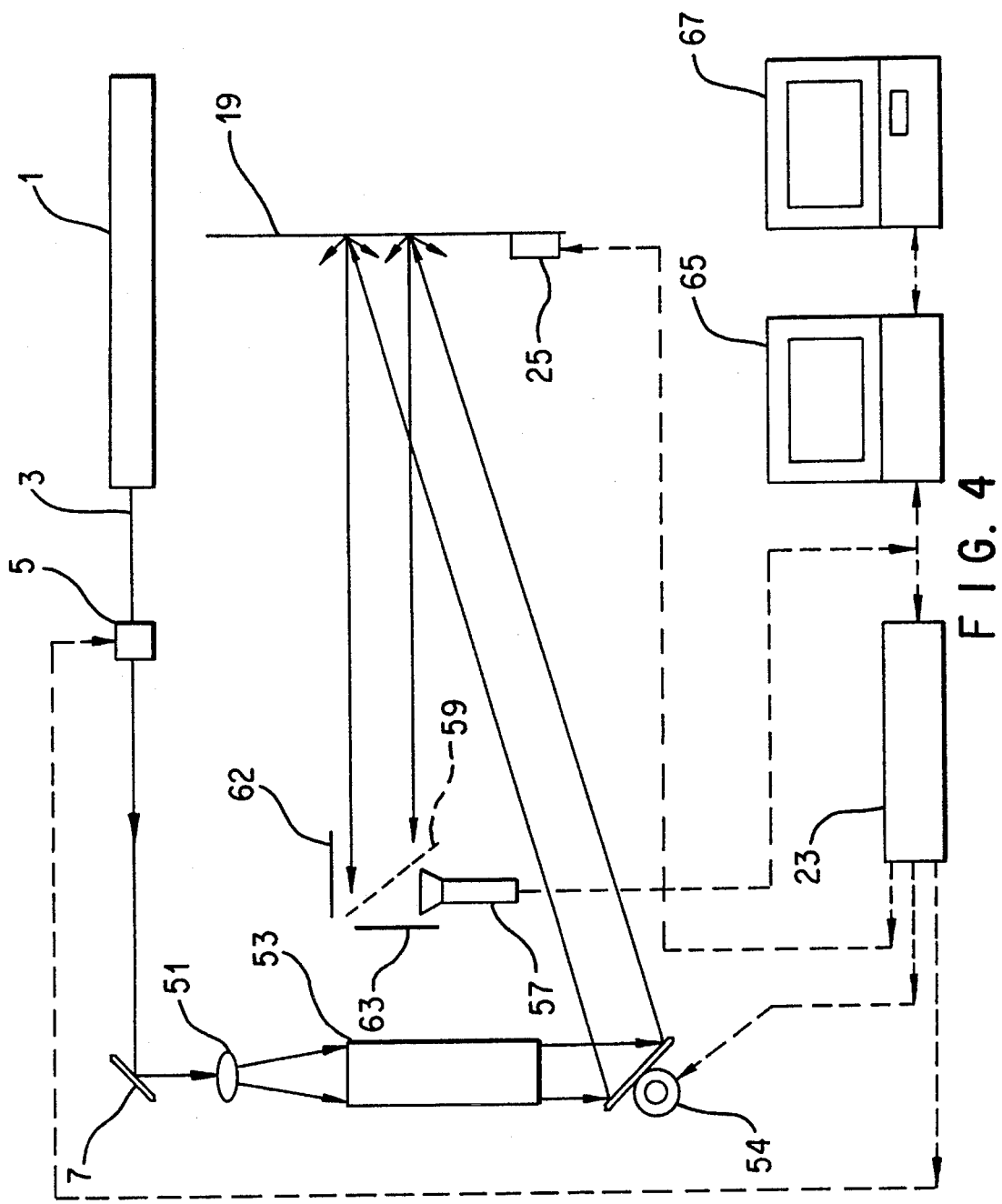
FIG. 4 provides a schematic diagram of an apparatus made according to the present invention, wherein the method of interferometry is shearography, and wherein phase shift are induced in both beams used to form the interferometric image.

The arrangement of FIG. 4 is similar to that of FIG. 3, except that the phase shift is induced in both beams which interfere to produce the shearogram. In particular, mirror 55 has been replaced by tilting mirror 54, and movable mirror 61 has been replaced by fixed mirror 62. Tilting the mirror 54 causes a non-uniform phase shift in both images forming the shearogram. In this case, the phase of the wavefront is modified before image shearing occurs.

The test object can be stressed acoustically simply by placing a loudspeaker in the vicinity of the object, and energizing the loudspeaker so as to direct acoustic waves toward the object. Alternatively, one could place a vibrating member directly on the object, as suggested in the figures, so as to transmit vibrational movement to the object.

Figure 6:
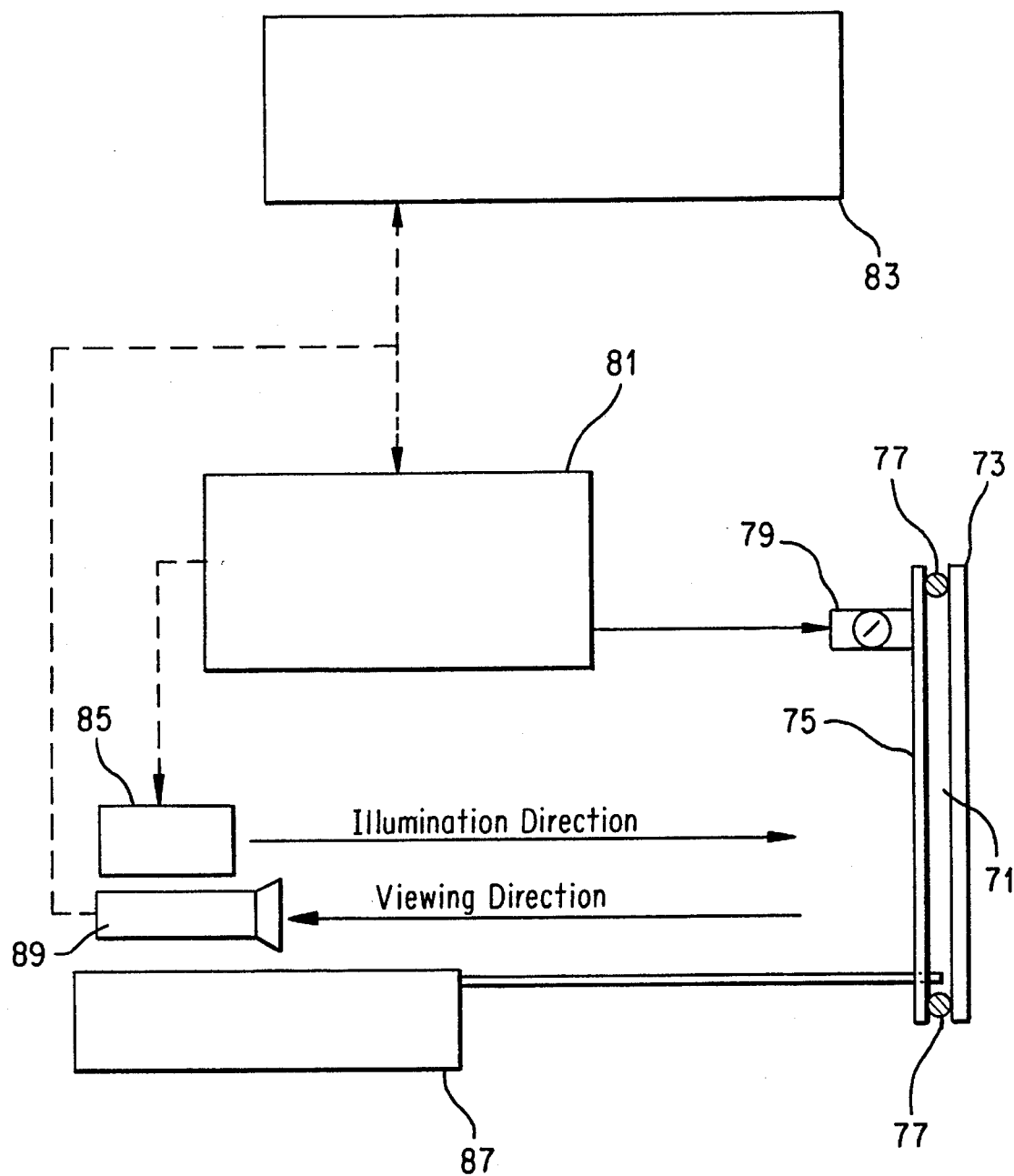
FIG. 6 provides a schematic and block diagram illustrating a means of applying a varying level of pressure to the object, according to the present invention.
Figure 7A:
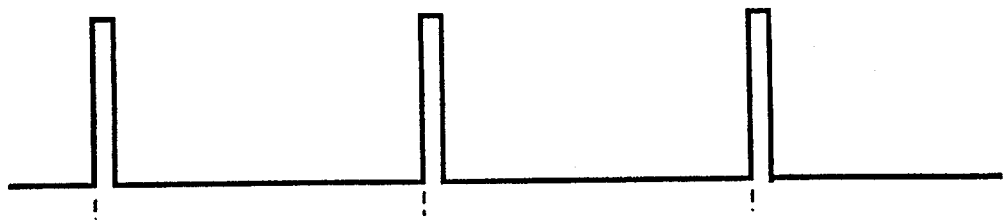
FIG. 7 provides a pulse diagram similar to that of FIG. 5, except that the stressing of the object is performed by pressurizing the object.
Figure 7B:
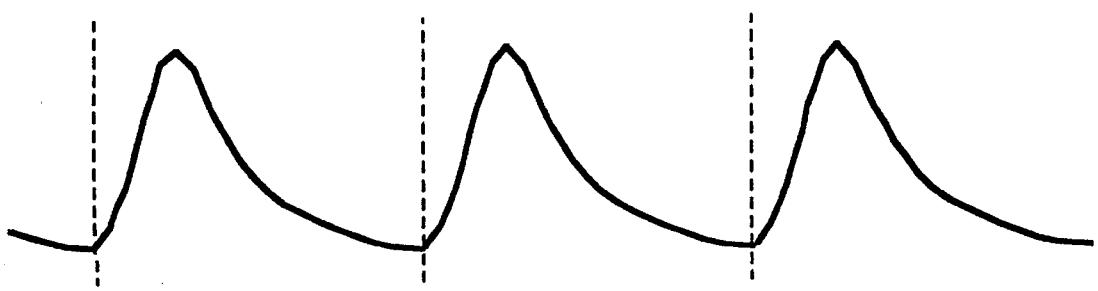
Figure 7C:
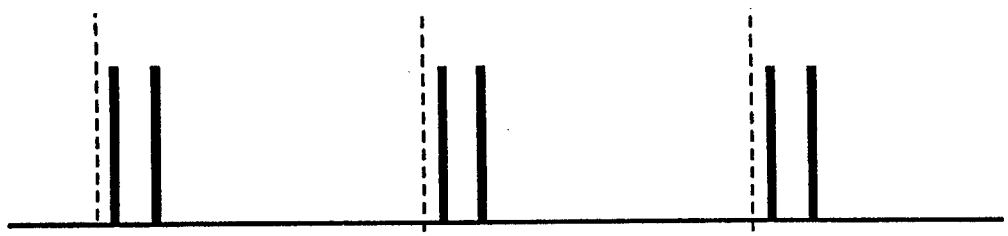
Figure 7D:
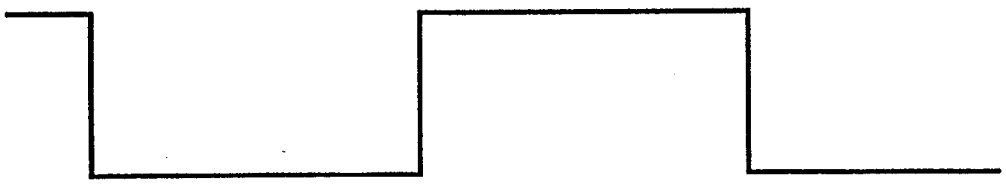

The test object can also be stressed by applying a varying amount of pressure. FIG. 6 provides a schematic diagram of an arrangement for creating such pressure. In FIG. 6, chamber 71 is defined by test object 73, plastic plate 75, and O-ring seal 77. Solenoid valve 79 directs air from a source (not shown) into chamber 71. The solenoid valve is precisely controlled by synchronization system 81 which controls optical shutter 85, and which is itself controlled by unit 83 which includes an image processor, a computer, and a display. CCD camera 89 receives light reflected from the object. Vacuum source 87 evacuates chamber 71.

A signal from synchronization system 81 causes the solenoid valve 79 to open and close, so as to allow outside air to enter chamber 71 at certain predetermined times. The solenoid valve effectively varies the level of vacuum in the chamber, in synchronization with the formation of video frames by the CCD camera. FIG. 7 shows an example of how one can vary the pressure in the chamber.

In FIG. 7, pulses 91 represent the video refresh pulses. Pulses 93 represent variations in pressure in the chamber, caused by actuation of the solenoid valve. In the example of FIG. 7, there is one such variation in pressure for each video frame. It is also possible to provide more than one pressure variation per frame. Pulses 95 represent the optical shutter; in this example, an interferometric image is taken twice during each frame, at different levels of pressure. Pulses 97 indicate the phase shifts produced between video frames.

Other means of stressing the object can be used with the present invention. The acoustic and pressure stressing techniques are examples only, and are not intended to limit the scope of the invention.

FIGS. 8–11 provide illustrations which compare the results obtained with the present invention with those obtained from prior art techniques. In FIGS. 8–10, the test object was an aluminum plate (having dimensions of 2.5× 25×30.5 cm) with a flat-bottomed hole having a diameter of 7.6 cm, leaving a membrane located near the center of the plate of 0.08 cm thickness. In FIG. 11, the test object was a two-layer aluminum composite plate having a thick back plate (of thickness 1.27 cm) and a thin front plate (0.08 cm thick) bonded together using an epoxy adhesive. Seven artificial disbonds (four circular disbonds of 7.6, 5, 2.5 and 1.27 cm in diameter, and a square, a triangular, and an elliptic disbond) were introduced into the bonding layer by placing thin sheets of Teflon between the two plates prior to bonding.

An argon laser, having an output power of 1 W at a wavelength of 514 nm, was used as the coherent light source. The reference beam was produced by illuminating a ground glass with one leg of the expanded laser beam. Phase shifting was accomplished by using a tilting mirror that deflected the reference beam by a small amount. The tilting mirror was made using a thin mirror glued onto a piezoelectric transducer. The mirror was switched from one position to another between each frame acquisition but otherwise remained stable during each frame. Thus, during image acquisition, any decorrelation between successive fringe patterns arose only from environmental noise.

The reference and reflected beams were collected by a CCD camera and recorded by a digital image processor capable of performing image subtraction at rates of 15 Hz. The subtracted images were sent directly to a long persistence monitor. Acoustic stressing was accomplished by a broadband piezoelectric transducer.

Figure 8A:
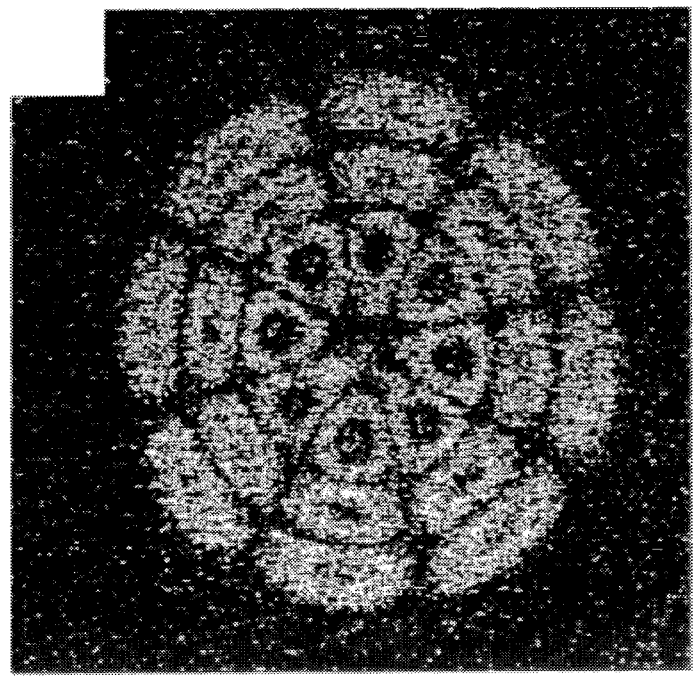
FIGS. 8A and 8B show interference patterns obtained from real-time speckle interferometry, FIG. 8A representing a purely subtractive procedure, and FIG. 8B representing the additive-subtractive procedure of the present invention, both patterns being taken in the absence of appreciable noise.
Figure 8B:
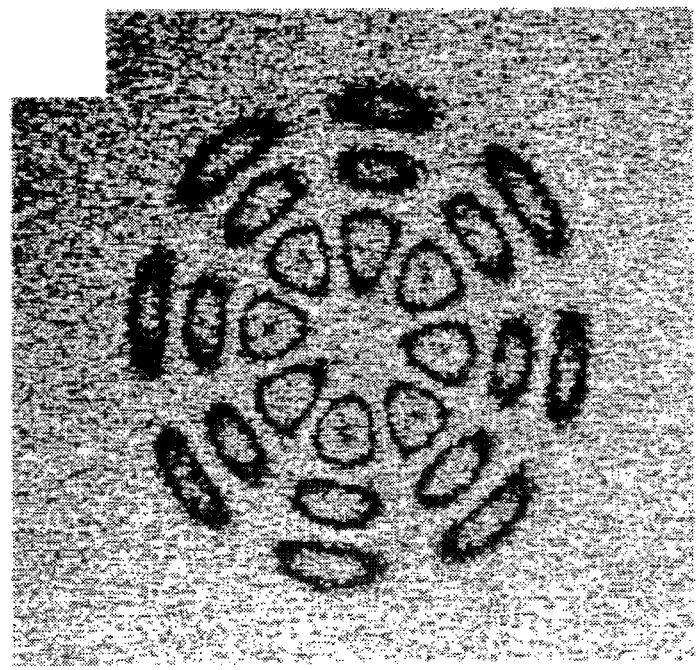

FIGS. 8A and 8B compare the results of the present invention and those of the prior art, in the absence of noise. In both figures, the object was made to vibrate at 31 kHz. FIG. 8A shows the result obtained from the subtractive speckle interferometry technique of the prior art. FIG. 8B shows the result obtained from the additive-subtractive technique of the present invention. Although no noise was intentionally added, there was still some ambient noise in the laboratory, which is especially apparent in FIG. 8A.

Figure 9A:
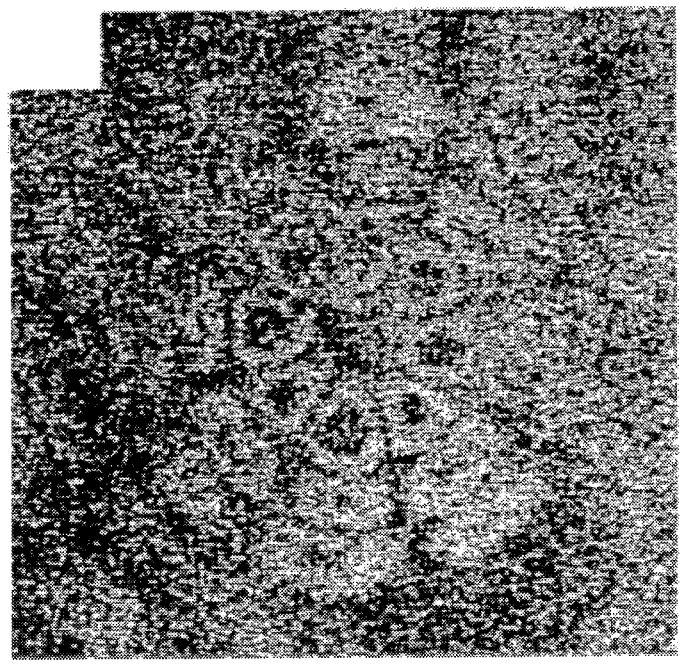
FIGS. 9A and 9B are similar to FIGS. 8A and 8B, respectively, except that extraneous thermal noise has been artificially introduced.
Figure 9B:
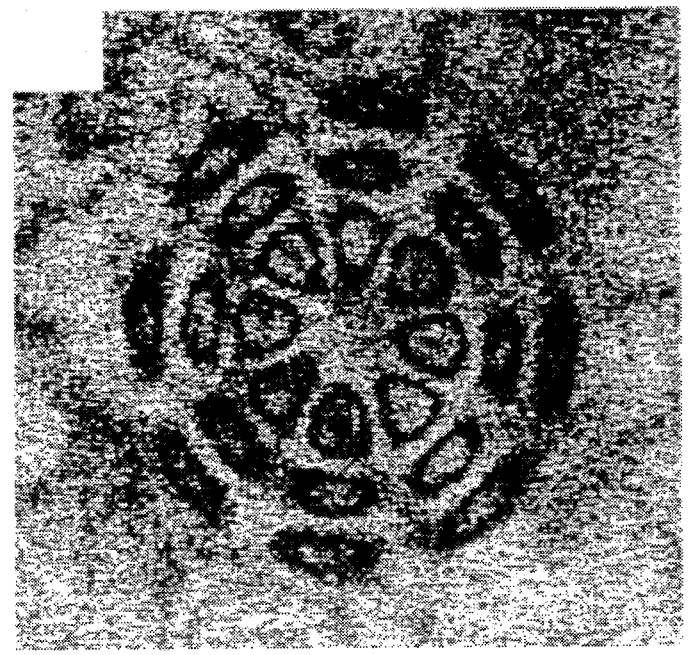

FIGS. 9A and 9B show the results obtained with the artificial introduction of thermal noise. The thermal noise arose from a heater placed between the CCD camera and the test object, which was still vibrating at 31 kHz. FIG. 9A shows the pattern obtained from the prior art subtractive speckle interferometry method. FIG. 9B shows the result obtained from the additive-subtractive speckle interferometry technique of the present invention. As shown in the figures, the fringes obtained by the prior art method have very poor contrast, and in fact are all but invisible in many places.

Figure 10A:
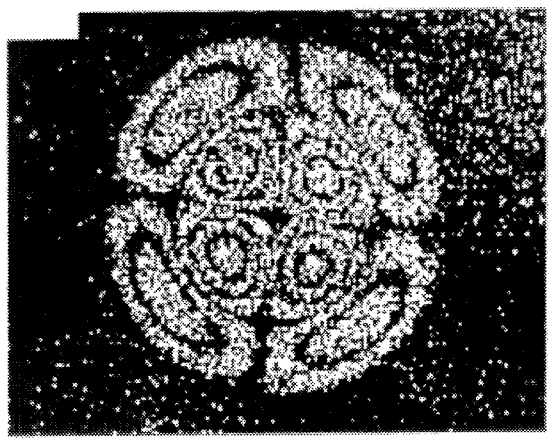
FIGS. 10A through 10D show interference patterns of the same object, taken with and without vibrational noise, FIGS. 10C and 10D having been made according to the method of the present invention.
Figure 10B:
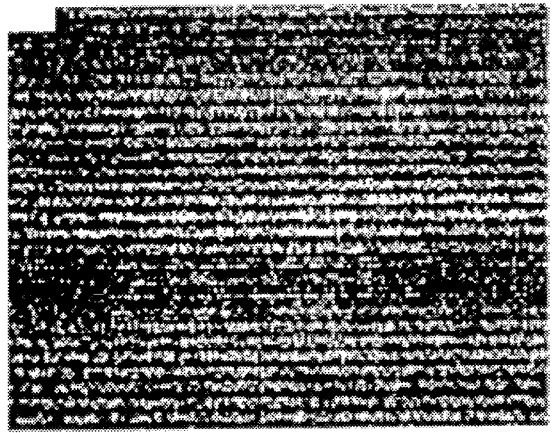
Figure 10C:
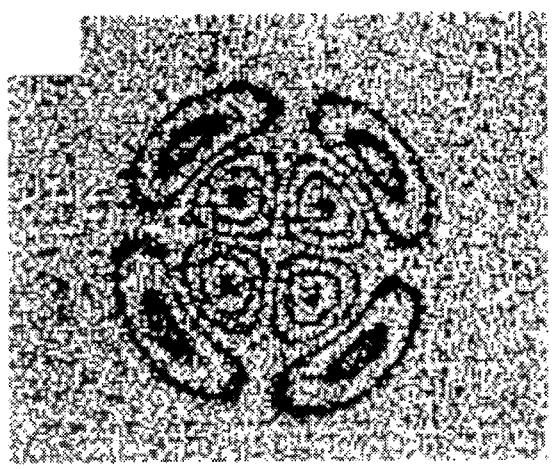
Figure 10D:
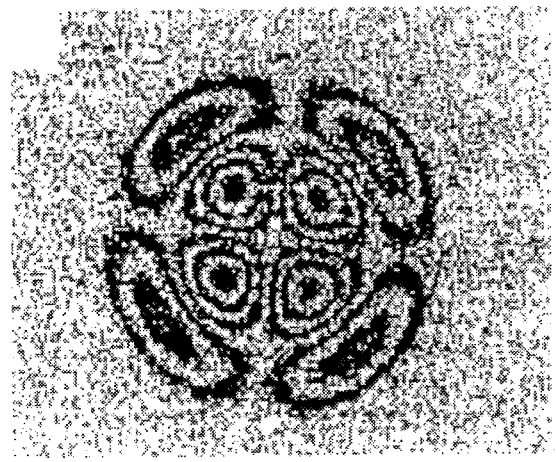

FIGS. 10A–10D show the results obtained when the experiment was repeated with vibrational noise, created by a speaker mounted adjacent to the test object. The speaker was driven with a frequency of about 20 Hz, which is of the same order of magnitude as the video rate. FIGS. 10A and 10B show the results obtained with a prior art subtractive speckle interferometry technique, without and with noise, respectively. FIGS. 10C and 10D show the results obtained with the additive-subtractive speckle interferometry of the present invention, without noise and with noise, respectively.

Figure 11B:
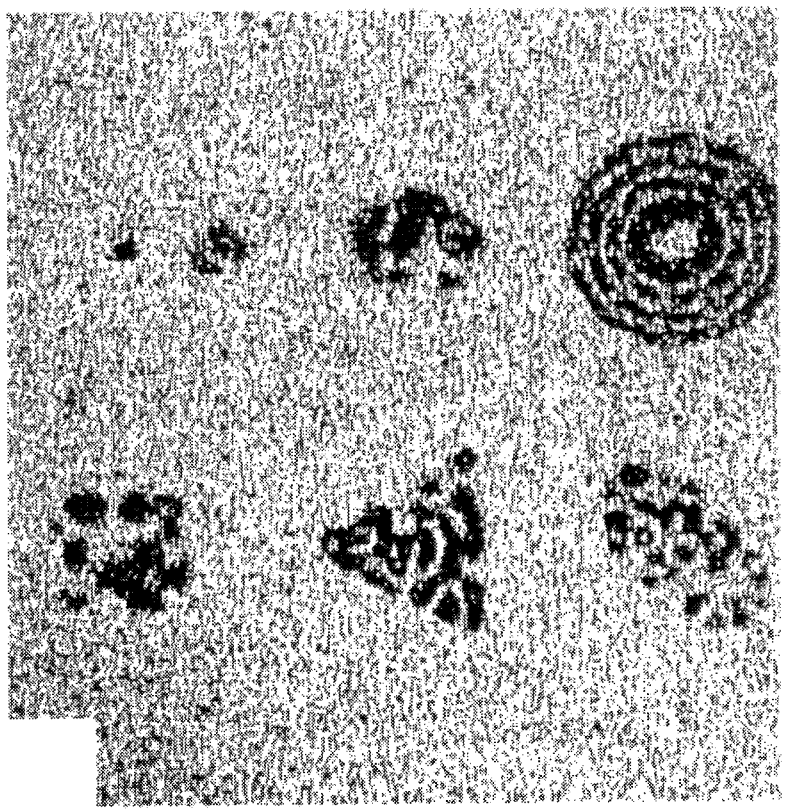
FIGS. 11A and 11B show an interference pattern corresponding to a test object having a known defect, FIG. 11B representing the results obtained with the present invention.
Figure 11A:

FIGS. 11A and 11B show the results obtained with the test object having known disbonds. The object was vibrating at 44 kHz during the test. FIG. 11A represents the results obtained from the prior art subtractive technique, and FIG. 11B shows the results obtained from the additive-subtractive technique of the present invention. With the present invention, the four circular disbonds (appearing on the right-hand side) and the square, triangular and elliptic disbonds are all clearly visible. With the prior art method, the disbonds are obscured by ambient noise, to varying degrees. Note that in this experiment, no extraneous noise was introduced. The present invention clearly produced superior results.

The present invention has the advantage that the signal to noise ratio of the final composite pattern can be enhanced by averaging the signal over time. With the purely subtractive techniques of the prior art, the interferometric images vary, in space and in time, from one video frame to the next. In the latter case, averaging will not produce a benefit; indeed, it tends to eliminate the signal, since the images are different from one frame to the next, and an averaged signal will produce no useful information. But with the present invention, the images can be taken at the same relative places and times, within each frame. Averaging over a plurality of frames tends to "lock in" the signal, and further reduces the effect of noise.

The present invention is not limited by the means of performing interferometry. Nor is it limited by the means of stressing the object, as virtually any time-varying stressing arrangement could be used. Many variations of the embodiments described above are therefore possible. Such variations, and others which will be apparent to those skilled in the art, should be considered within the spirit and scope of the following claims.

What is claimed is:

1. A method of nondestructively analyzing a test object, the method comprising the steps of:
   a) applying a time-varying level of stress to the object,
   b) obtaining two images of the object on a video camera, the video camera producing video frames, each frame corresponding to an interval of time, wherein the images are obtained at two distinct levels of stress, and adding the images together to produce a composite image, the adding being performed in an analog manner, during an interval of time associated with a same video frame,
   c) repeating step (b) wherein the images are obtained with light that has been shifted in phase, and
   d) deriving a second-order composite image by subtracting the composite image obtained in step (b) from the composite image obtained in step (c), wherein the second-order composite image contains graphical information on the structural integrity of the object.

2. The method of claim 1, wherein the adding step is performed by obtaining a repeated exposure of the object on an image sensor.

3. The method of claim 1, wherein the subtracting step is performed by dividing the composite images of steps (b) and (c) into pixels having intensity levels, and subtracting each intensity level of one of said composite images from a corresponding intensity level of another of said composite images.

4. The method of claim 1, wherein the images obtained in steps (b) and (c) comprise interference patterns formed by interference between a light beam reflected from the object and a reference beam.

5. The method of claim 1, wherein the images obtained in steps (b) and (c) comprise interference patterns formed by interference between two laterally-displaced images of the object.

6. The method of claim 1, wherein each repetition of step (b) is performed for a similar set of levels of stress on the object.

7. The method of claim 1, wherein the phase-shifted light is obtained by moving a mirror in a path of a beam used to generate one of the images.

8. The method of claim 1, wherein the phase-shifted light is produced by passing light through an electro-optic modulator.

9. A method of nondestructively analyzing a test object, the method comprising the steps of:
   a) forming at least two interferometric images of the object on an image sensor of a video camera, the camera defining a sequence of video frames, wherein at least one pair of interferometric images are formed during a given frame, wherein the object is subjected to a varying level of stress during said given frame, and wherein each interferometric image of said at least two images is formed at a different level of stress, the interferometric images formed during said given frame being added together in an analog manner by multiple exposure of the image sensor of the camera to all of said interferometric images formed during said given frame to produce a composite image comprising the sum of said interferometric images formed during said given frame, said composite image being converted to digital form,
   b) repeating step (a) during a subsequent video frame, wherein at least one light beam used to form an interferometric image is phase-shifted relative to a previous frame, and
   c) digitally subtracting the composite images formed in steps (a) and (b) for said given frame and for said subsequent frame, to form a second-order composite image, wherein the second-order composite image shows information about the object.

10. The method of claim 9, wherein each pair of interferometric images are formed at corresponding levels of stress of the object.

11. The method of claim 9, wherein the images obtained in steps (a) and (b) comprise interference patterns formed by interference between a light beam reflected from the object and a reference beam.

12. The method of claim 9, wherein the images obtained in steps (a) and (b) comprise interference patterns formed by interference between two laterally-displaced images of the object.

13. The method of claim 9, wherein the phase-shifted light is obtained by moving a mirror in a path of a beam used to generate one of the images.

14. Apparatus for nondestructively analyzing a test object comprising:
   a) means for directing a beam of light towards the object,
   b) optical head means for detecting light reflected from the object and for generating an interferometric image of the object using the reflected light, the detecting means including a video camera comprising means for detecting images during a sequence of video frames,
   c) means for stressing the object,
   d) means for shifting a phase of the beam of light directed towards the object,
   e) means for synchronizing operation of the directing means, the stressing means, and the phase shifting means, the synchronization means providing means for obtaining at least two interferometric images at different levels of stress on the object during a particular video frame, the synchronization means also comprising means for controlling the phase-shifting means,
   f) means for adding said at least two interferometric images, taken during said video frame, in an analog manner, to produce a composite image, and for storing the composite image in digital form, and
   g) means for subtracting the composite digital image taken during a given video frame from a composite digital image taken during a previous frame.

15. The apparatus of claim 14, wherein the optical head means includes means for causing interference between a beam of light reflected from the object and a reference beam.

16. The apparatus of claim 14, wherein the optical head means comprises a shearography camera.

17. The apparatus of claim 14, wherein the stressing means is selected from the group consisting of an acoustic stressing means and a pressure stressing means.

18. The apparatus of claim 14, wherein the beam of light is reflected from at least one mirror, and wherein the phase shifting means comprises means for moving said mirror.

19. An apparatus for nondestructively testing an object, comprising:
   a) means for exposing an image sensor of a video camera to at least one pair of interferometric images of the object, such that the pair of interferometric images are added together in an analog manner to create a composite image, the interferometric images being formed with a light beam having a phase, and means for storing the composite image in digital form,
   b) means for stressing the object in a manner such that the interferometric images of each pair are obtained at different levels of stress,
   c) means for altering a phase of the interferometric images, and
   d) means for subtracting the composite image from another composite image obtained by altering the phase of the light used to form the image, the subtracting means comprising means for generating a second-order composite image which provides information on a condition of the object.

20. The apparatus of claim 19, wherein the phase altering means comprises a movable mirror.

* * * * *